(No Model.) 2 Sheets—Sheet 1.
H. ROUART.
APPARATUS FOR STERILIZING WATER OR OTHER LIQUIDS.
No. 538,599. Patented Apr. 30, 1895.
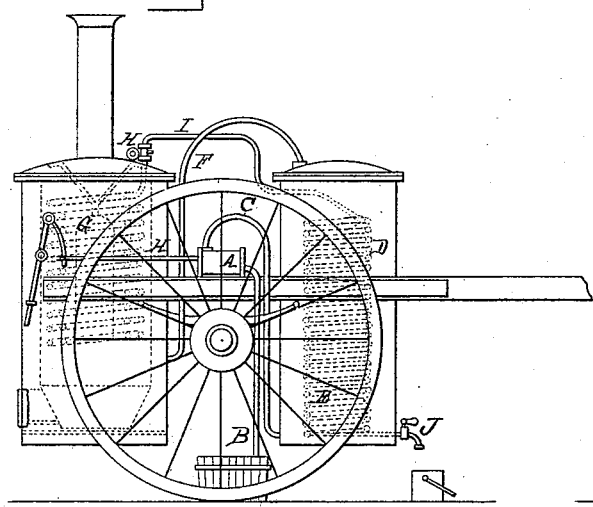
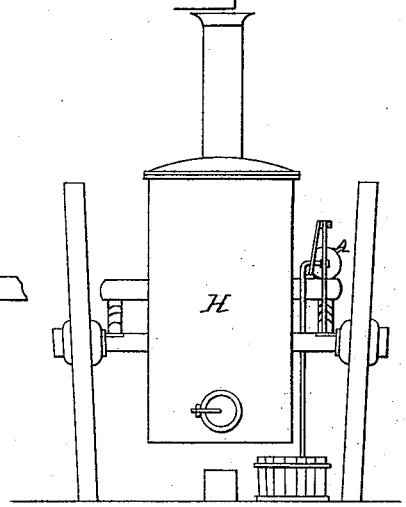
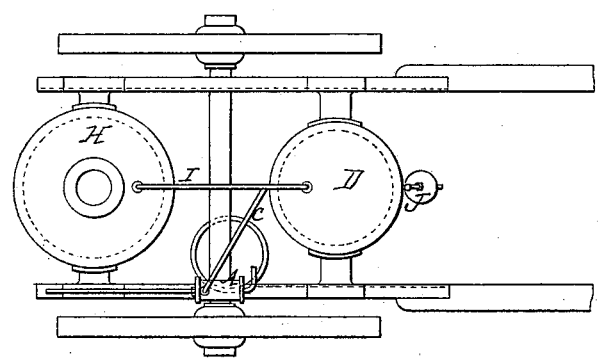
WITNESSES:
George Baumann
John Revell
INVENTOR
Henri Rouart
BY
Howson and Howson
his ATTORNEYS

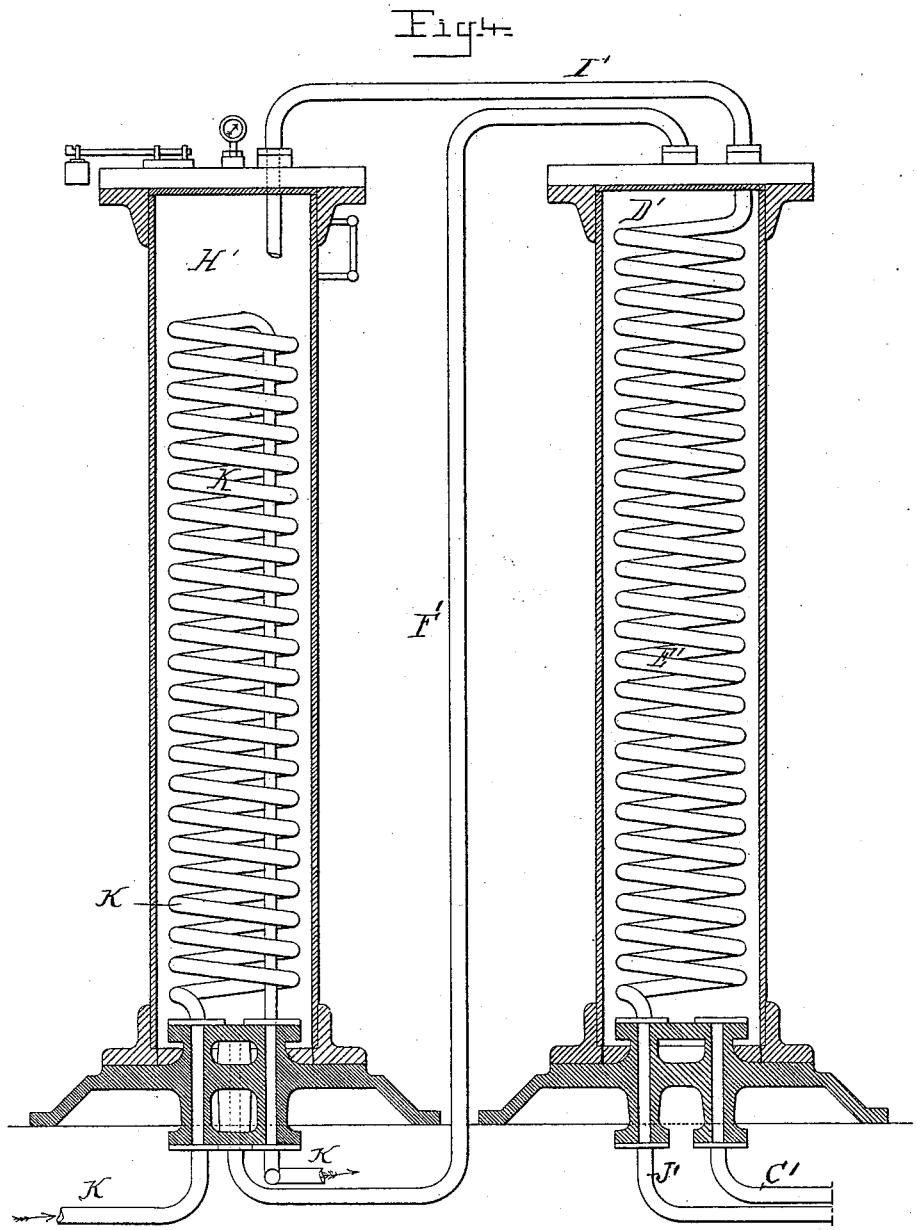

UNITED STATES PATENT OFFICE.

HENRI ROUART, OF PARIS, FRANCE.

APPARATUS FOR STERILIZING WATER OR OTHER LIQUIDS.

SPECIFICATION forming part of Letters Patent No. 538,599, dated April 30, 1895.

Application filed January 6, 1891. Serial No. 376,932. (No model.) Patented in England September 6, 1890, No. 14,051.

*To all whom it may concern:*

Be it known that I, HENRI ROUART, engineer, of Paris, in the Republic of France, have invented an Apparatus for Sterilizing Water or other Liquids by destroying, at a high temperature, microbes that they may contain, (for which I have received Letters Patent in Great Britain, No. 14,051, dated September 6, 1890,) of which the following is a specification.

This invention relates to an apparatus capable of rendering valuable services at all times and especially when epidemic diseases are prevalent by sterilizing water and other liquids and freeing them from all the microbes or germs that they may contain while still retaining the air by exposing the liquid to high temperatures in apparatus which also continuously delivers the water or other liquid in a cool drinkable state as hereinafter described.

When a liquid is simply boiled before being used it is commonly believed that the microbes or like organisms which it contains are entirely destroyed but this is not the case in fact, and moreover the air which the liquid contained in solution is driven off and has to be restored by agitation or otherwise, and that with great risk of introducing a fresh supply of germs or organisms.

Certain microbes require a temperature of at least 120° centigrade in order to destroy their vitality and I have now invented an apparatus enabling liquids containing such microbes to be heated to 120° centigrade and upward without causing them to part with the air which they contain thus simultaneously destroying the microbes contained in the air as well as those contained in the liquid.

The operation is conducted in principle as follows in sterilizing water, for example: A closed vessel, which I will call a boiler, nearly full of water and capable of resisting considerable pressure is heated either by the direct action of a fire or by means of steam until the water which it contains is heated to a temperature of at least 120°. This water is directly supplied to the boiler through an internal or external plunging or immersed pipe placed in communication with the ordinary main or service pipes the pressure in which is usually greater than two kilograms. The water having been heated in the closed vessel or boiler for a suitable time enters a coiled pipe or worm immersed in water wherein it is cooled and is discharged at the extremity of the pipe in a cold condition retaining the air which it holds in solution and deprived of all the living microbes or germs which may have been present either in the said air or in the water and which have been destroyed or deprived of vitality by exposure to the temperature of 120° centigrade. When a supply of water under pressure is not available or in case the pressure is insufficient the pressure is obtained or supplemented by the aid of a small pump or other forcing apparatus with continuous action.

The sterilizing apparatus itself is continuous in its action which is regulated by two cocks controlling the admission and escape of the liquid. With this object a gage glass is provided in the top of the boiler and the cocks are provided with micrometer adjusting screws. The outlet must be regulated in such a manner as to compel the liquid to remain in the heating apparatus for a sufficient period to enable the sterilization to be completed.

In order that my said invention may be fully understood I shall now proceed more particularly to describe the same and for that purpose shall refer to the several figures on the annexed sheet of drawings the same letters of reference indicating corresponding parts in all the figures.

Figures 1, 2, and 3 of the accompanying drawings illustrate a portable apparatus according to this invention. Fig. 1 represents the apparatus in side elevation. Fig. 2 is a plan view, and Fig. 3 an end elevation. Fig. 4 is a slight modification.

In the apparatus illustrated in Figs. 1, 2 and 3, which in place of being mounted on wheels as represented in the drawings may stand upon any suitable fixed support, the water for example being drawn by a pump A passes in the first place through a filter B in order to separate the matter held in suspension, and flowing through a pipe C enters at the lower part of a closed chamber D where it ascends in contact with a coiled pipe or worm E in which the sterilized water flows downward in order to be cooled. From the top of the chamber D the water passes through a pipe F into a pipe forming one or two series of coils or worms G inclosed in a case or chamber H and heated by the direct action of a furnace, for example. The pipe F connects with the coil G at the lower part of the chamber H. The water circulating in this coiled pipe has its temperature raised to 120° centigrade and upward and on leaving the coils is conducted by a pipe I to the cooling worm E. After being thus sterilized and cooled the water is discharged through a tap J. The circulation is continuous and regulated as stated by the admission and discharge cocks or taps or by the action of the pump.

Fig. 4 illustrates in vertical section a modification of the apparatus according to which the water is heated in a closed vessel H' by a steam pipe or worm K. The liquid supplied by a pipe C' ascends a vessel D' in contact with a worm E' and flows through a connecting pipe F' to the bottom of the heating or sterilizing vessel H' in which its temperature is raised to 120° centigrade or upward by the steam coil K. The sterilized water is then passed by pipe I' to the coil E' where it is cooled by circulating in the cooling worm E' in the vessel D', receiving the cold water entering the apparatus, and is drawn off through a pipe J'.

This apparatus may be constructed of smaller size for smaller works or for chemists or household purposes. They may be arranged in such a manner as to permit of meat being boiled in the water. This meat may then be preserved for a considerable period if protected from the atmosphere. Pharmaceutical and other products may also be prepared and dissolved by these means, water and other liquids when heated to 120° centigrade and upward having great power for dissolving or saturating such materials.

This apparatus may also be employed for the destruction of microbes in wine, beer and milk being especially well adapted for destroying the microbe of tuberculosis which is frequently present in milk.

The apparatus in its portable form is placed on a two or four wheeled carriage. In its stationary form it simply stands upon the ground.

In place of being heated by steam or direct action of a furnace the liquid may be conveniently heated by gas. For this purpose it is simply necessary to arrange suitable gas burners in the fire place or furnace of the apparatus.

A safety valve may be provided in order that the pressure may not become too great and a thermometer or the like may be employed to indicate the temperature.

The sterlized water is applicable to many useful purposes such as the manufacture of aerated waters or in brewing, in the manufacture of ices and in general in all trades in which water is employed in the production of articles of food when it is of the greatest importance to employ none but water that is absolutely free from microbes having been sterilized by exposure to a temperature of 120° or a still higher temperature if necessary. It is also a great advantage to the public to have at its disposal and for daily use bottles filled with sterilized water and which may be substituted for mineral waters commonly used as a beverage especially during the prevalence of an epidemic.

I claim as my invention—

An apparatus for sterilizing water or other liquids comprising two closed chambers or vessels, the first chamber being provided with an inlet and an outlet at the top and an inlet and an outlet at the bottom, the second chamber being provided with heating means, a water inlet at the bottom and a water outlet at the top, a pipe connecting the outlet at the top of the first chamber with the water inlet of the second chamber, a pipe connecting the outlet of the second chamber with the inlet at the top of the first chamber, and a coil of pipe, in the first chamber, connecting the inlet at the top with the outlet at the bottom, all substantially as set forth.

In testimony whereof I have signed my name to this specification in the presence of two subscribing witnesses.

HENRI ROUART.

Witnesses:
  JOSEPH DEHAGE,
  ROBT. M. HOOPER.